Sept. 20, 1966 S. OSTIS 3,274,025

METHOD OF FORMING AN ELECTRICAL CAPACITOR

Filed Dec. 13, 1963

INVENTOR.
Sotirios Ostis

BY Walter S. Zebrowski

ATTORNEY

United States Patent Office 3,274,025

Patented Sept. 20, 1966

3,274,025
METHOD OF FORMING AN ELECTRICAL CAPACITOR

Sotirios Ostis, St. Paul, Minn., assignor to Corning Glass Works, Corning, N.Y., a corporation of New York Filed Dec. 13, 1963, Ser. No. 330,412
3 Claims. (Cl. 117—217)

This invention relates to a method of forming electrical capacitors and more particularly to a method of forming thin film capacitors wherein the dielectric is silicon monoxide, but is in no way limited to such applications.

In the art of forming silicon monoxide dielectric capacitors a first electroconductive film is vapor deposited on a base or substrate, a film of silicon monoxide (SiO) is vapor deposited over said first film, and thereafter a second electroconductive film is vapor deposited upon the silicon monoxide film. In the past it has been necessary to deposit the silicon monoxide film at relativly slow rates of up to 10 A. per second and preferably below 5 A. per second to maintain the dissipation factor (tangent of loss angle) and leakage of said capacitor at suitable levels. Such slow deposition rates, however, greatly add to the cost of the article and are not suitable for large scale production. High deposition rates, over 10 A. per second, cause the silicon monoxide film to be stressed to a degree where said capacitors have a significantly high dissipation factor and leakage.

It is an object of this invention to provide an improved method for forming an electrical capacitor wherein the dielectric is silicon monoxide.

Another object of this invention is to provide a method for forming a silicon monoxide dielectric capacitor which has a low dissipation factor and leakage.

A further object is to provide a method of forming an electrical capacitor where the silicon monoxide dielectric is vapor deposited at rates in excess of about 10 A. per second while the capacitor has a low dissipation factor and leakage.

A still further object is to provide a method of forming an electrical capacitor having a fast deposited silicon monoxide dielectric and a low dissipation factor wherein the capacitor plates are not deleteriously affected.

In accordance with this invention, the method in its broader aspect comprises depositing successive films of metal, silicon monoxide, and metal, the metallic films having a thickness in excess of about 5000 A., and thereafter heating the article so formed to a temperature ranging from about 500° C. to about 560° C. for a predetermined period of time to anneal said film of silicon monoxide thereby decreasing the dissipation factor and leakage of said capacitor.

Additional objects, features, and advantages of the present invention will become apparent, to those skilled in the art, from the following detailed description and the attached drawings, on which, by way of example, only the preferred embodiments of the invention are illustrated.

Briefly, the art of coating by vapor deposition comprises establishing a zone of vaporization within an evacuated chamber to vaporize material therein and thereafter depositing the vaporized material upon a substrate whereupon said material condenses. For a detailed description of means for vapor deposition suitable for the purposes of this invention, reference is made to "Vacuum Deposition of Thin Films" by L. Holland, John Wiley and Sons, Inc., 1961.

Figure 1:
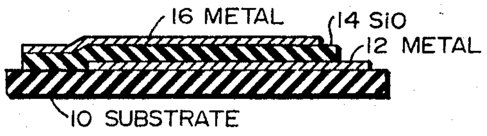
FIGURE 1 is a cross sectional elevation of a capacitor formed in accordance with the method of this invention.
Figure 2:
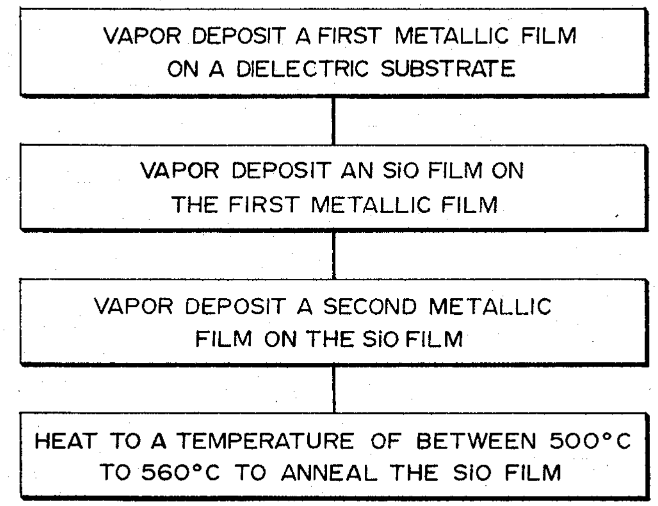
FIGURE 2 is a flow diagram of the method of this invention.

Referring to FIGURE 1, there is shown a dielectric substrate 10 having two relatively large flat planar surfaces. Suitable substrate materials are glass, ceramics and the like. A first metallic film 12, having a thickness in excess of about 5000 A. is vapor deposited at a fast rate of deposition on one of the flat substrate surfaces to form one of the capacitor plates. As used herein, the term fast rate of deposition means vapor deposition in excess of 10 A. per second. A film 14 of silicon monoxide is applied over film 12 by vapor deposition at a rate in excess of 10 A. per second leaving a portion of film 12 exposed for subsequent lead attachment. Various means for masking and selective deposition are well known in the art and suitable means can be readily selected by one familiar with the art. A second metallic film 16, having a thickness in excess of about 5000 A. is similarly vapor deposited at a fast rate of deposition over film 14 to form the second of the capacitor plates. The various films are applied within an evacuated chamber within which the film material was vaporized and thereafter condensed upon the desired surface. Suitable vapor deposition means can be readily selected by one familiar with the art. Suitable capacitor plate materials are aluminum, silver, and the like.

It has been found that the silicon monoxide film, of a capacitor formed as hereinabove described, is stressed or unstable resulting in a high capacitor dissipation factor and leakage. According to the instant invention, the capacitor is removed from the evacuated chamber, placed in a suitable oven, heated to a temperature ranging from about 500° C. to about 560° C. for a predetermined period of time, such as for example up to 15 minutes, and thereafter suitably cooled, whereupon the silicon monoxide film is annealed or stabilized and the capacitor dissipation factor and leakage is significantly decreased. It has been found that the dissipation factor is decreased by more than an order after such annealing. Annealing for a period of time in excess of about 15 minutes does not significantly increase the change of the capacitor characteristics. The capacitor may either be cooled slowly or simply quenched in air. It has also been found that the capacitor may be annealed in vacuo with substantially the same results as when annealed in air.

The metallic films 12 and 16, comprising the capacitor plates, are formed having a thickness in excess of about 5000 A. It has been found that thinner metallic films oxidize right through or otherwise decompose at annealing temperatures of about 500° C. or higher.

A typical example of carrying out the instant invention is illustrated by the following. A capacitor was formed by vapor depositing in vacuo a first aluminum film having a thickness of about 5000 A. at the rate of about 23 A. per second on a borosilicate glass substrate. A film of silicon monoxide having a thickness of about 10,000 A. was vapor deposited at the rate of about 23 A. per second upon the aluminum film. A second aluminum film having a thickness of about 5000 A. was vapor deposited upon the silicon monoxide film also at the rate of 23 A. per second. The capacitor so formed had a capacitance of 355 picofarads and a dissipation factor of 0.061. The capacitor was heated in an atmospheric furnace to 520° C. and maintained at this temperature for 15 minutes and thereafter air cooled. The dissipation factor of the annealed capacitor was 0.0052.

Another capacitor was formed with the aluminum plates and the silicon monoxide film vapor deposited at a rate of about 25 A. per second to the same thickness and in the same manner as described above, on a borosilicate glass substrate. The capacitor so formed had a capacitance of 362 picofarads and a dissipation factor of 0.061. Upon annealing under the same conditions described above, the dissipation factor was reduced to 0.0032.

It is readily seen that, when desired, a capacitor may be formed in accordance with the instant method having a plurality of pairs of plates as herein described with each of the plates being separated by a silicon monoxide film.

Capacitors formed in accordance with this invention are readily reproducible, having a low dissipation factor and leakage, while the instant method is suitable for large scale production. Further, such capacitors can be formed inexpensively, quickly, and without deleterious affects on the capacitor plate material.

Although the present invention has been described with respect to specific details of certain embodiments thereof, it is not intended that such details be limitations upon the scope of the invention except as set forth in the following claims.

I claim:

1. In the method of forming an electrical capacitor comprising the steps of vapor depositing in vacuo on a dielectric substrate successive films of metal, silicon monoxide, and metal in the order named, the improvement comprising heating the capacitor so formed to a temperature ranging from about 500° C. to about 560° C. to anneal said film of silicon monoxide thereby decreasing the dissipation factor of said capacitor.

2. The method of forming an electrical capacitor comprising the steps of applying by vapor deposition at a rate in excess of 10 A. per second in vacuo on a dielectric substrate successive films of metal, silicon monoxide, and metal, said metal films having a thickness in excess of about 5000 A., heating the capacitor so formed to a temperature ranging from about 500° C. to about 560° C. to anneal said film of silicon monoxide, and thereafter cooling the capacitor.

3. The method of forming an electrical capacitor comprising the steps of vapor depositing in vacuo on a dielectric substrate a first aluminum film having a thickness in excess of about 5000 A., vapor depositing a film of silicon monoxide upon said first aluminum film at a rate in excess of 10 A. per second, vapor depositing a second aluminum film having a thickness in excess of about 5000 A. upon said film of silicon monoxide, heating the capacitor so formed to a temperature ranging from about 500° C. to 560° C. to anneal said film of silicon monoxide, and thereafter cooling the capacitor.

References Cited by the Examiner

UNITED STATES PATENTS

| | | | |
|---|---|---|---|
| 3,094,650 | 6/1963 | Riegert | 117—106 X |
| 3,158,502 | 11/1964 | Bremer | 117—106 X |

OTHER REFERENCES

Siddall: "Vacuum," vol. 9, No. 5/6, November 1959/January 1960, pp. 274–287 (pp. 278–284 relied on).

Novice: "Brit. J. Appl. Phys.," vol. 13, 1962, pp. 561–563.

German application H 16744 VI/48d, March 1956.

ALFRED L. LEAVITT, *Primary Examiner.*

RICHARD D. NEVIUS, *Examiner.*

W. L. JARVIS, *Assistant Examiner.*